United States Patent
Marr et al.

(10) Patent No.: US 10,237,331 B2
(45) Date of Patent: **\*Mar. 19, 2019**

(54) CONTENT DELIVERY METHODS AND SYSTEMS

(71) Applicant: Activision Publishing, Inc., Santa Monica, CA (US)

(72) Inventors: Michael Marr, Monroe, WA (US); Keith Kaplan, Bothell, WA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,700

(22) Filed: Jan. 15, 2016

(65) Prior Publication Data

US 2016/0134685 A1 May 12, 2016

Related U.S. Application Data

(63) Continuation of application No. 14/135,322, filed on Dec. 19, 2013, now Pat. No. 9,246,972.

(51) Int. Cl.
*H04L 9/32* (2006.01)
*H04L 29/08* (2006.01)
(Continued)

(52) U.S. Cl.
CPC .............. *H04L 67/06* (2013.01); *G06F 21/10* (2013.01); *G06F 21/6218* (2013.01); *H04L 9/0631* (2013.01); *H04L 9/3247* (2013.01); *H04L 63/0428* (2013.01); *H04L 63/0435* (2013.01); *H04L 63/061* (2013.01); *H04L 63/062* (2013.01); *H04L 63/18* (2013.01);
(Continued)

(58) Field of Classification Search
CPC ..... H04L 67/06; H04L 9/0631; H04L 9/3247; H04L 63/0428; H04L 63/0435; H04L 63/061; H04L 63/062; H04L 63/18; H04L 65/4069; H04L 65/607; G06F 21/10; G06F 21/6218; G06F 2221/0755; G06F 2221/2107
USPC ........................................................ 713/176
See application file for complete search history.

(56) References Cited

U.S. PATENT DOCUMENTS 5,911,046 A * 6/1999 Amano .............. H04N 7/17336
348/E5.008
6,668,324 B1 12/2003 Mangold et al.
(Continued)

OTHER PUBLICATIONS

Frank Hartung, Digital Rights Management and Watermarking of Multimedia Content for M-Commerce Applications, IEEE Communications Magazine o Nov. 2000; p. 78-84.*
(Continued)

*Primary Examiner* — Monjur Rahim
(74) *Attorney, Agent, or Firm* — Klein, O'Neill & Singh, LLP

(57) ABSTRACT

The present invention relates generally to systems and methods for delivering content from content providers to end users using computer networks. Aspects of the invention enable content providers cost-effective content delivery using, for example, download and peer-to-peer mechanisms, while also allowing content providers the ability to control and restrict usage of the content and combat piracy. These and other aspects of the invention are discussed in more detail herein.

23 Claims, 7 Drawing Sheets

(51) Int. Cl.
    *H04L 29/06*     (2006.01)
    *G06F 21/62*     (2013.01)
    *G06F 21/10*     (2013.01)
    *H04L 9/06*     (2006.01)

(52) U.S. Cl.
    CPC ........ *H04L 65/4069* (2013.01); *H04L 65/607* (2013.01); *G06F 2221/0755* (2013.01); *G06F 2221/2107* (2013.01)

(56) References Cited

U.S. PATENT DOCUMENTS

| | | | |
|---|---|---|---|
| 2002/0010756 A1* | 1/2002 | Oku | H04L 29/06 709/217 |
| 2002/0071556 A1* | 6/2002 | Moskowitz | G11B 20/00086 380/210 |
| 2003/0204738 A1 | 10/2003 | Morgan | |
| 2004/0083361 A1 | 4/2004 | Noble et al. | |
| 2007/0192586 A1 | 8/2007 | McNeely | |
| 2008/0059724 A1* | 3/2008 | Stifter, Jr. | G06F 12/0284 711/154 |
| 2010/0185776 A1 | 7/2010 | Hosur et al. | |
| 2010/0199311 A1 | 8/2010 | Chang et al. | |
| 2014/0015964 A1* | 1/2014 | Chew | H04N 5/232 348/143 |
| 2014/0025839 A1 | 1/2014 | Marko et al. | |
| 2015/0101003 A1* | 4/2015 | Bull | H04N 21/64761 725/116 |

OTHER PUBLICATIONS

Martina Podesser, Selective Bitplane Encryption for Secure Transmission of Image Data in Mobile Environments; IEEE; Year: 2002, pp. 1-6.

U.S. Appl. No. 14/135,322, filed Dec. 19, 2013, Michael Marr Keith Kaplan, Office Action dated May 18, 2015; Notice of Allowance dated Sep. 15, 2015.

* cited by examiner

CONTENT DELIVERY METHODS AND SYSTEMS

CROSS-REFERENCE TO RELATED APPLICATION

The present application is a continuation of U.S. patent application Ser. No. 14/135,322, filed Dec. 19, 2013, the disclosure of which is incorporated by reference herein.

The present invention relates to systems and methods for content delivery in computer networks.

The proliferation of computer networks such as the Internet has facilitated the widespread distribution and consumption of information and content. Using computer networks, content providers serve a variety of content to end users including audio/visual media, software applications, documents, website content, social networks, e-commerce content, videogame assets or media, etc.

Content providers deliver content to end users in different ways. Content providers may, for example, "stream" their content to end users such that the sub-portions of content are constantly received by and consumed by or presented to an end-user while being delivered by the provider. For example, in the case of streaming audio, only a small number of seconds of the content may need to be available to the end-user for playback at a given moment in time even if the overall length is several minutes or hours. Alternatively or additionally, a content provider may, for example, make their content available for download by the end users such that a complete copy of the content is stored locally on an end user's device for consumption by or presentation to the user at a later time without necessarily requiring access to a network.

Tradeoffs exist between delivery methods. Streaming content on-demand to the end user, for example, may be expensive compared to making the same content available for download, as a given unit of content must be re-transmitted to an end user every time the end user wishes to consume the content. Re-transmission can be particularly expensive when content providers host their content with third-party service providers such as content delivery networks (CDNs), who charge, in part, based on the amount of data transmitted on behalf of the content providers. Similarly, CDNs may charge different rates at different times of the day or for different locations, so streaming data on-demand may force the content provider to pay a higher rate for delivery of the content. Furthermore, streaming tends to require a higher-quality or higher-bandwidth network connection to deliver the content consistently in real time, since the rate that the data is received determines the fidelity of the end-user experience.

On the other hand, making content available for download and storage on the end user's device reduces re-transmission fees and allows content to be consumed without the need for on-the-fly buffering and/or a network connection. However, allowing content to persist on end user devices may increase the likelihood of piracy or unauthorized usage of the content.

BRIEF SUMMARY OF THE INVENTION

One aspect of the invention provides a method performed by a first computer for delivering a content file to a second computer, comprising: dividing the content file into blocks (herein known as the "payload blocks") and encoding the blocks and any additional data related to the payload block encoding (herein known as the "overhead blocks") into a first channel and second channel; transmitting to the second computer the first channel for local storage of said second computer; receiving a request from the second computer to present the content file on said second computer; streaming to the second computer the second channel; wherein the first channel and second channel must be collectively processed to present the blocks of the original content file.

In another aspect of the invention, the payload blocks are transformed before encoding to channels, where the transformation comprises a compression algorithm, cryptographic hashing, cryptographic encryption or combinations thereof. Additional data associated with the transformation, such as cryptographic keys, computed hashes or decompression tables, are encoded to the overhead blocks before encoding to channels. These transformed blocks of the original content file will also be known herein as "payload blocks", and it is understood by those of ordinary skill in the art that the payload blocks may require additional processing (e.g., decryption or decompression) in order to reconstruct the original content.

In another aspect of the invention, the amount of data encoded to the first channel is substantially of a predetermined ratio to the amount of data encoded to the second channel for each block of the original content file.

In another aspect of the invention, the amount of data encoded to the first channel may vary relative to the amount of data encoded to the second channel for each block of the original content file.

In another aspect of the invention, the amount of data encoded to the second channel for each block of original content is less than or equal to the previous block (i.e., the amount of data monotonically decreases as the block index increases). Specifically, this means that the first block of data is larger than or equal in size to the last block of data encoded to the second channel.

In another aspect of the invention, at least 85% of the payload data is encoded to the first channel.

In another aspect of the invention, the data encoded to the first channel and/or the second channel is transformed using a compression algorithm, cryptographic hashing, cryptographic encryption or combinations thereof. Additional data associated with the transformation, such as cryptographic keys, computed hashes or decompression tables, are encoded to either the first or second channel.

In another aspect of the invention, all cryptographic data, such as keys or hashes, required to decrypt or validate the integrity of the payload data is encoded to the second channel.

In another aspect of the invention, encoding the original content file into a first channel and second channel further comprises selecting segments of the original content file for one channel or the other based on the original content format. For example, for certain video content, the video "key frames" might be encoded to the second channel while "delta frames" are encoded to the first channel. In an example using binary executable programs, the stream of instruction opcodes might be encoded to one channel while the instruction registers might be encoded to another channel. In some embodiments, the selection is based on the criticality of the data to the reconstruction of the original content; in the previous example, "key frames" might be characterized as more critical for playback than delta frames and therefore reserved for the streamed second channel to improve resistance to unlicensed consumption of the content.

In another aspect of the invention, the encoding and/or transformations applied to the payload data may be selected based on fitting in the size and/or bandwidth constraints of the second channel. For example, if the second channel encodes cryptographic material and should represent only 5% of the total amount of data transmitted to the end user, the size and number of cryptographic keys or other encoding overhead may be constrained.

In another aspect of the invention, the first channel comprises data from payload blocks and the second channel comprises data from overhead blocks and/or payload blocks.

In another aspect of the invention, digital watermarks are included in the payload data encoded to the second channel. In some embodiments, these digital watermarks are unique each time the second channel is delivered to any user. This allows the content to be identified uniquely for a specific instance of streaming the content to a user.

In another aspect of the invention, the size of the second channel is based, in part, on the network connection quality between the first computer and the second computer. The network connection quality can be approximated through a variety of techniques including user supplied information, or using one or more measured network characteristics between the user and content provider endpoints such as the round trip time (RTT) of sending and receiving packets, one-way measurements of latency, bandwidth and/or throughput measurements.

In another aspect of the invention, the size of the first content channel is based, in part, on storage limits and/or user-specified storage consumption preferences for the second computer.

In another aspect of the invention, the method further comprises the step of determining the probability that an end user will request the content file.

In another aspect of the invention, transmitting to the second computer the first channel comprises transmitting at least some portion of the first channel during hours or times of the day not necessarily correlated with user consumption of the content. In one aspect, a content provider may want to deliver the data to the user's device during periods of cheaper rates or improved bandwidth of the CDN. In another aspect, the user may prefer to receive the data during periods of cheaper rates or improved bandwidth of their own internet service provider (ISP).

In another aspect of the invention, transmitting to the second computer the first channel comprises transmitting at least some portion of the first channel from a third computer.

In another aspect of the invention, transmitting to the second computer the first channel comprises transmitting at least some portion of the first channel over a WiFi connection.

In another aspect, the invention further comprises encrypting the first channel, the second channel, or both. In another aspect, the invention further comprises transforming the content file using a compression algorithm. In another aspect, the invention further comprises transforming the first channel, the second channel, or both using a compression algorithm. In another aspect, the invention further comprises determining an amount of available storage space available on the second computer. In another aspect, the invention further comprises determining a probability that a first end user will request the original content file and wherein determining the probability that the first end user will request the original content file is based on content consumption history of other end users not within a social network of the first end user. In another aspect, the invention further comprises identifying a set of original content files available for delivery from the first computer to the second computer.

In another aspect of the invention, transmitting to the second computer the first channel comprises transmitting at least some portion of the first channel during off-peak hours.

In another aspect of the invention, transmitting to the second computer the first channel comprises transmitting at least some portion of the first channel from a third computer.

In another aspect of the invention, transmitting to the second computer the first channel comprises transmitting at least some portion of the first channel over a WiFi connection In another aspect of the invention, transmitting to the second computer the first channel comprises delivering at least some portion of the first channel through an offline medium.

In another aspect, the invention further comprises determining the format of the original content file.

In another aspect of the invention, the determined format of the original content file is an audiovisual media file.

In another aspect of the invention, the determined format of the original content file is a binary executable program.

In another aspect the invention may provide a system useful in provision of digital content, comprising a server coupled to a network, the server configured by program instructions executing on at least one processor to encode information of a content file to a first subset of channels and a second subset of channels, with use of information of the content file being dependent upon the information encoded to both the first subset of channels and the second subset of channels; transmit the first subset of channels over the network; and responsive to a request received over the network relating to the second subset of channels, transmit the second subset of channels over the network. In another aspect of the invention the server is further configured to perform a cryptographic operation on the information encoded to the first subset of channels, and in some aspects the server is further configured to encode cryptographic information related to the cryptographic operation to the second subset of channels, and in some aspects the cryptographic information comprises cryptographic keys. In another aspect of the invention, the server is further configured to monitor at least some network parameters indicative of quality of a network connection and in some aspects server is further configured to modify allotment of information to be encoded to the first subset of channels and the second subset of channels based on the network parameters. In some aspects of the invention, the transmissions over the network are to an end user device. In another aspect of the invention, the transmissions over the network are to the end user device and the end user device is configured to provide for videogame play and to transmit to the server indications of progress of play of a videogame.

In another aspect, the invention may provide a method useful in providing content over networks, comprising providing a first channel for storage on an end user device, the first channel including first information of a content file, the first information insufficient for use of the content file or portion thereof for its intended use; receiving an indication over a network for transmission of a second channel, the second channel, in conjunction with the first channel, allowing for effective recovery of the content file or portion thereof for its intended use; and transmitting the second channel over the network to the end user device. In some aspects of the invention, the indication received over the network comprises a request for the content file.

These and other aspects of the invention are more fully comprehended upon review of this disclosure.

DETAILED DESCRIPTION

The present invention relates generally to systems and methods for delivering content from content providers to end users using computer networks. Aspects of the invention enable content providers cost-effective content delivery using, for example, download and peer-to-peer mechanisms, while also allowing content providers the ability to control and restrict usage of the content and combat piracy. These and other aspects of the invention are discussed in more detail herein.

Figure 1:
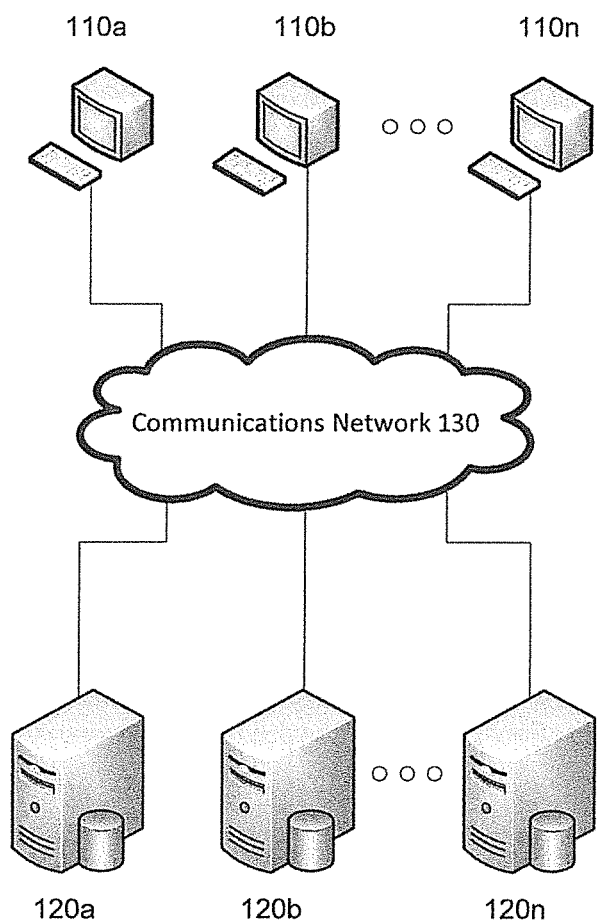
FIG. 1 illustrates an example of a system in accordance with aspects of the invention.

FIG. 1 illustrates an exemplary system 100 in accordance with aspects of the invention. System 100 includes various components, including one or more end user devices 110a-110n, one or more content servers 120a-120n, and one or more communications networks 130. The number of components shown in FIG. 1 is exemplary, and in most embodiments, many end user devices, content servers, and communications networks exist.

Generally, content providers host and distribute content using content servers 120a-120n. In some embodiments, content providers may own and operate their own content servers. Alternatively or additionally, in some embodiments content providers may use content servers owned and operated by third-party service providers (e.g., a content delivery network). Additionally or alternatively, in some embodiments content may be replicated on end user devices 120a-120n and distributed using peer-to-peer technologies and/or protocols (e.g., BitTorrent, Pando Media Booster, etc.). In some embodiments, hybrid models involving a plurality of content hosting and delivery mechanisms may be used. For example, in some embodiments, content providers may host their content on their own content sever (e.g., an origin server) and later replicate or cache the content on one or more content delivery network's content servers. Further, as end user devices download and store the content, the end user devices may distribute the content to other end users using peer-to-peer technologies and protocols.

Through one or more communications networks 130, end user devices 110a-110n access and receive content hosted on content servers 120a-120n or other end user devices 110a-110n. End user devices 110a-110n may comprise any compute device suitable for receiving and consuming content over a computer network and include, for example, desktop computers, laptop computer, videogame consoles, portable videogame devices, cellular phones, smartphones, tablets, portable media devices, etc.

Figure 2:
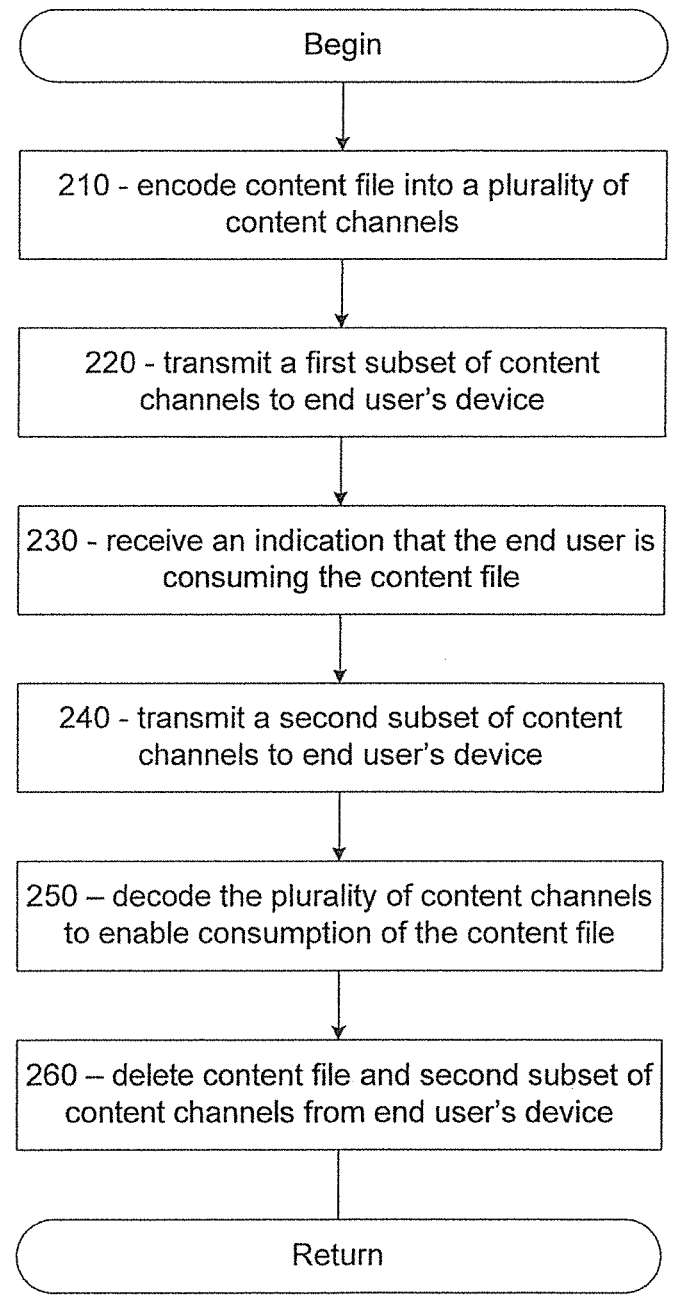
FIG. 2 is a flow chart of a process for delivering content to an end user in accordance with aspects of the invention.

FIG. 2 is a flow chart of a process for delivering content to an end user in accordance with aspects of the invention. The process may be performed, for example, by the systems and components described in connection with FIGS. 1 and 4. Generally, the process provides for the delivery of an original content file from a content server (or an end user seeding the original content file) to one or more end users. The process encodes the original content file into a plurality of files, which may be referred to as "channels." The plurality of channels collectively comprise the original content file and any additional data needed to decode and/or transform the channels to recover the original content file, or an end-user consumable variation of the original content file. In one preferred embodiment, a channel cannot be independently used or otherwise decoded to derive any end-user consumable portion, or in some embodiments any portion, of the original content file. In some embodiments a channel or a subset of channels may be used or decoded to derive only a portion of the original content file, for example a portion to be initially consumed, with derivation or decoding of other portions of the content file requiring all of the channels. The process then transmits a first subset of the channels to the end user's device, in many embodiments at a time substantially before the end user consumes any portion of the original content file. The first subset of channels are stored on the end user's device. When the process receives an indication that the end user wishes to begin consuming a portion of the original content file on the end user device, the process transmits a second subset of the channels (i.e., the channels not delivered previously) to the end user's device, at which time the various channels are processed and decoded to derive the portion of the original content file for consumption. In one preferred embodiment, the second subset of channels is not stored on the end user device after consumption of the original content file is completed. Examples of such processing are discussed in more detail herein.

In Block 210, the process encodes an original content file as a plurality of files or data streams called "channels". In a preferred embodiment, the channels are encoded such that no individual channel or subset of channels can be consumed independently or otherwise used to derive or infer any portion of the original content file. In other words, the original content file can only be derived by collectively processing all of the channels. There are many ways to encode the channels in accordance with the invention. By way of example, the following discussion assumes the original content file is encoded into two channels, though in other embodiments, more than two content channels may be used. Likewise, it is understood by those of ordinary skill in the art that the portions of the original file (or the associated encodings into channels) may be processed incrementally in sub-blocks without requiring the complete file to be transmitted before processing or consumption can occur.

In one example of encoding an original content file, the original content file, or more generally content of the original content file, is cryptographically encoded into two channels such that the first channel is comprised of n-byte blocks of data (where "n" is some number of bytes less than the size of the original content file) each having a cryptographic key. The number of blocks is dependent on the size of each n-byte block, the size of the original content file, and any additional data or padding that increases the size of the encoded content relative to the original file. The cryptographic keys corresponding to the n-byte blocks are encoded in the second channel.

In Block 220, the process transmits a first subset of the channels to the end user's device and stores the data on the end user device in a way that is locally accessible at a later time, such as to the local mass storage device (e.g., HDD, SSD, optical disc, etc.) or otherwise buffered in memory. The first subset of the channels may be, for example, the first channel. The process may transmit the first channel in various ways. For example, in some embodiments, one or more content servers may transmit the first channel to the end user's device. In other embodiments, one or more of the end user's peer devices may transmit the first channel to the end user's device using peer-to-peer technologies or protocols. Further, in some embodiments, a hybrid approach may be used, whereby a combination of dedicated content servers and peer devices transmit the first channel to the end user.

In a preferred embodiment, the first subset of channels is transmitted to the end user at a time substantially before the end user consumes the original content file. In a preferred embodiment, the transmission of the first subset of content channels occurs at a time when transmission rate is less critical, such that the process may opportunistically take advantage of lower-cost delivery methods. For example, methods using peer-to-peer delivery, off-peak delivery (e.g., transmission during times with lower costs-of-delivery), low-priority delivery (e.g., delivery with a lower quality of service (for example as compared to a delivery quality of service of the second subset of channels) or delivery not exceeding a certain transmission rate), low-cost transmission medium (e.g., delivery over a cheaper medium such as a WiFi connection instead of cellular connection), etc. may be utilized for the transmission of the first subset of content channels. In some embodiments, the first subset of channels is delivered through an "offline" medium such as a DVD or other optical disc, hard drive device (HDD), solid-state device (SDD), etc.

In Block 230, the process receives an indication that the end user wishes to consume some portion of the original content file. For example, if the original content file is a media file, the process may receive an indication that the end user is requesting to play the content. In another example, if the original content file is a media file or asset used in a videogame, the process may receive an indication that the end user has requested the media file or asset or advanced to a stage in the videogame that requires the media file or asset. In another example, if the original content file is an executable program, the process may receive a request indicating that the end user is requesting to run the program. One of ordinary skill will recognize that the original content file may be any type of file suitable for delivery over a computer network.

In Block 240, the process transmits a second subset of channels to the end user (i.e., the remaining undelivered channels). For example, in the example of two content channels described above, the process transmits the second channel to the end user's device. In some embodiments, the process "streams" the second subset of channels to the end user's device such that the end user's device may begin processing the received portions of the second subset of channels while still receiving the second subset of channels. In other embodiments, the end user's device may download the second channel completely before processing the collective content channels for playback or consumption.

The process may transmit the second channel in various ways. For example, in some embodiments, one or more dedicated content servers may transmit the second channel to the end user's device. In other embodiments, one or more of the end user's peer devices may transmit the second channel to the end user's device. Further, in some embodiments, a hybrid approach may be used, whereby a combination of dedicated content servers and peer devices transmit the second channel. In some embodiments, the second channel is transmitted with a higher quality of service than the first channel.

In some embodiments, the process may store the second channel in the end user device's mass storage (e.g., a hard disk, solid state drive or removable memory component). However, in many embodiments, the process buffers the second channel temporarily in internal memory (e.g., RAM, processor cache or internal registers/buffers).

In Block 250, the process decodes the plurality of channels to enable consumption of the original content file. In various embodiments decoding of the channels is performed by a user's device. Following the above example where the original content file is encoded into a first channel comprised of n-byte blocks of data each having a corresponding cryptographic key that is delivered in a second channel, the blocks of the first channel may be decoded as the corresponding key is received in the second channel, thereby allowing consumption of the original content file to begin before the second channel is received in its entirety. In other words, the content can be decoded incrementally as corresponding blocks and/or units of data are received from the respective content channels participating in the encoding. For example, in a streaming video embodiment, the process might be able to decode and display the video in 10 second increments instead of requiring the entire video to be downloaded before the first 10 seconds are displayed, so may only need to buffer "10 seconds" of the second channel before it may begin processing and displaying that part of the video.

In Block 260, after the end user has consumed the original content file, any parts of the original content file that were produced for end user consumption as well as any parts of the second subset of content channels is removed from the end user's device. In a some embodiments, the original content file and second subset of content channels are retained only as long as required for end user consumption, and/or only written to main memory and never stored on mass storage, and/or overwritten by subsequent consumption of other chunks of the original content file; in this case, only a few chunks of the content file and second subset of content channels need to be removed from the end user's device.

In some embodiments, the process may choose to retain portions of the original content file and/or second channel based on the format of the original content file or other parameters associated with the original content file. For example, in embodiments where the original content file is a media file, the process may choose to retain sufficient portions of the original content file and/or second channel to allow the user to scrub (or rewind) the original content file by a certain amount of time during playback. As another example, in embodiments where the original content file is rented for a certain period of time, the process may remove the original content file and/or second channel only after the rental period has expired. As another example, in embodiments where the original content file is an asset to be used in a videogame, the process may remove the original content file and/or second channel after the user progresses past the level in which the original content file is being used. One of ordinary skill will recognize that other strategies may be used to determine when to remove the original content file and/or second channel, or portions thereof. Indeed in some embodiments, the original content file may be kept indefinitely afterwards.

The process thereafter returns.

Aspects of the invention provide cost-effective delivery of content to end users while still providing content providers with similar anti-piracy properties of content that is, or is effectively, 100% streamed. As alluded to above, because the first portion of content channels is delivered at a time before the user consumes the content file, the portion of the content file contained in the first channels may be delivered using low-cost delivery techniques, such as using peer-to-peer delivery, off-peak delivery (e.g., transmission during times with lower costs-of-delivery), low-priority delivery (e.g., delivery with a lower quality of service or delivery not exceeding a certain transmission rate), low-cost transmission medium (e.g., delivery over a cheaper medium such as a WiFi connection instead of cellular connection), or preloaded on storage media (e.g., HDD, SSD, portable USB, DVD or other optical disc). In some embodiments, the first portion of content channels are cryptographically secured so that the data cannot be consumed or used to infer any portions of the original content file independent of the second subset of channels. As such, the portions of the content file in the first portion of channels are secured from piracy despite being potentially stored or otherwise buffered on the end user's device.

In accordance with the present invention, the channels may be encoded and delivered in various ways. In some embodiments, all or a majority of the payload data (i.e., data comprising the original content file) is encoded in the first channel, and all or a majority of the overhead data (e.g., data other than content file data such as key data, metadata, sequencing data, or any other data required to decode the first channel, etc.) is encoded in the blocks of the second channel. In some embodiments, the second channel may additionally contain an encoding of a portion of the payload data. This data may be split and/or selected for a channel based, in part, on aspects of the original file format. For example, in an embodiment for video streaming, video key frames might be stored in the second channel while the first channel contains only delta frames for video; in such an embodiment, it may not even be necessary to cryptographically encrypt the first channel at all since the video may not usefully playback without key frames.

In some embodiments, the payload data delivered in the second subset of channels is digitally "watermarked", as known in the art, such that when the original content is reconstructed it contains this digital watermark delivered in the second subset of channels. In some embodiments, the second subset of channels delivers a unique watermark every time the data is streamed in order to uniquely identify the digital rights license and/or end user device that the content was delivered to. If the original content is subsequently pirated or delivered outside of accordance with end user licensing arrangements, the watermark can be used to identify the original consumer of the content. In the previous video example, a digital watermark might be encoded to each key frame delivered in the second channel (or first channel) such that the reconstructed video will contain an invisible digital watermark in every frame of video. The original content type determines the kind of digital watermarking, but can be applied to video, audio, images and executables, as known to those experienced in the art.

In some embodiments, the ratio of the amount of data encoded to the first versus the second channel is variable and changes progressively throughout consumption of the content. For example, in some embodiments, the amount of data from the first channel required to decode the content decreases (or increases) progressively (e.g., from block to block of content) relative to the amount of data from the second channel. In yet other embodiments, the first channel and second channel maintain a substantially uniform ratio of data over the entirety of content.

In embodiments where portions of the content file are encoded in both the first and second channels, those portions are merged in the decoding process to enable consumption on the end user device. Using the previous key frame example, the key frames would be reinserted into the video stream with the delta frames.

In some embodiments, the size of the first channel and the size of the second channel are substantially of a predetermined ratio. For example, the first channel may comprise n-byte blocks and the second channel may comprise a corresponding number of m-byte blocks resulting in an n:m ratio between the first channel and second channel.

In some embodiments, the amount of data encoded to the second channel may be based in part on factors such as the measured or anticipated network connection quality between the transmitting computer(s) (e.g., content servers and/or peer content seeders) and the end user's device and the consuming application's anticipated or minimum consumption rate for the second channel. For example, if the second channel is to be streamed to the end user and processed and consumed "on the fly," the second channel can be sized in view of network constraints such that it can be delivered to the end user at the anticipated rate of consumption. The network connection quality between a transmitting computer and end user device can be approximated using one or more network characteristics including, for example, the round trip time (RTT) of sending and receiving packets, one-way measurements of latency, bandwidth and/or throughput measurements, and other quality of service metrics.

In some embodiments, the content file, content channels, or both are encrypted during the encoding process. For example, the content file may be encrypted before being encoded into a plurality of content channels. Alternatively or additionally, the process may encrypt the content channels after they are created. The content file and/or content channels may be encrypted using various encryption algorithms, including without limitation, the Advanced Encryption Standard (AES), and/or various modes of applying those encryption algorithms such as cipher block chaining, electronic code book, etc.

In some embodiments, the content file, channels, or both are compressed during the encoding process.

In embodiments where portions of the content file are encoded in both the first and second channels, those portions are merged in the decoding process to enable consumption on the end user device. In embodiments where the content file, channels, or both were encrypted, the process decrypts those components as well.

In another embodiment, the original content file is divided into n-byte blocks as previously described. These blocks are further grouped together into "m" blocks per group. The first block in each group is encrypted and the resulting enciphered data is XORed against each of the remaining m−1 blocks in the group. In some embodiments, this would be done in lieu of encrypting all the blocks directly with a cryptographic cipher in order to reduce the computational intensity of the decode operation (e.g., XOR is computationally cheaper than AES computations). The first block and its cipher key are delivered in the second channel while the remaining m−1 "XORed" blocks are delivered in the first channel. The first channel therefore encodes a fraction of the original content file approximately proportional to the fraction (m−1)/m, while the second channel contains the fraction 1/m of the original content data plus any additional data required to encode block encryption keys or other metadata as previously described. Since n and m can be flexibly selected, the proportion of original content delivered in the first channel versus the second channel can be set to a very wide range of proportions. The size of "n" may need to be large compared to "m" to retain the cryptographic strength or other tamper resistance properties of the encoding. A ratio of 10,000:1 is likely sufficient for most content delivery purposes. For example, if the original content data is 1 GB, "n" might be chosen to be 100 KB and "m" to be 10. So for every 1 MB of the content file, the first channel will encode 900 KB (i.e. nine blocks of 100 KB each) and the enabling channel will encode 100 KB of the content file plus the key data required to encrypt the 1 MB. In this example, the cryptographic cipher therefore need only be applied to 10% of the data, and the resulting cipher data is used to encipher (via XOR) the other 90% of the data, thereby substantially reducing the computational intensity of both encoding and decoding the data. In other embodiments, the first block of data can also be delivered in the first channel and encode only the cryptographic key material in the second channel.

Figure 3:
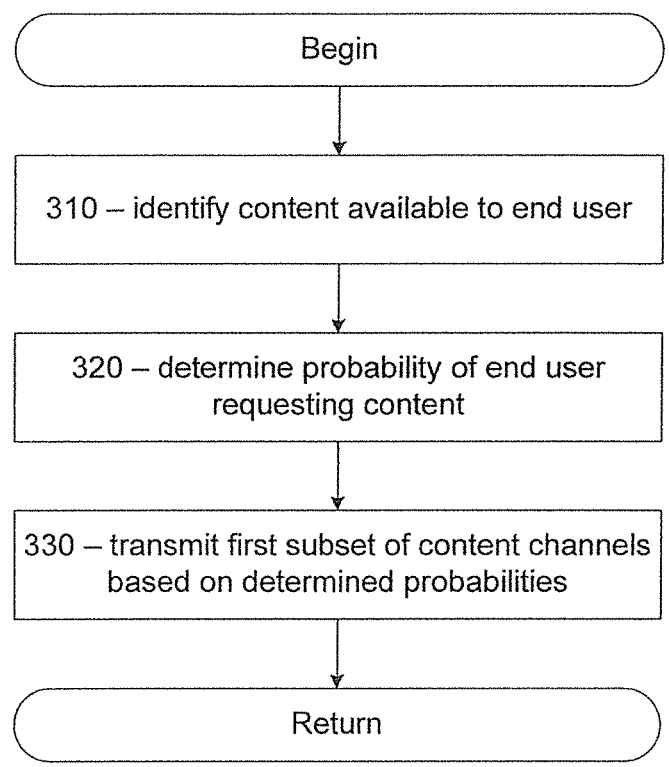
FIG. 3 is a flow chart of a process for predictively delivering or caching a first subset of content channels to an end user in accordance with aspects of the invention.

FIG. 3 is a flow chart of a process for predictively delivering or caching a first subset of channels to an end user device in accordance with aspects of the invention. The process may be used in conjunction with the processes described, for example, in connection with FIG. 2 and herein. The process may be performed, for example, by the systems and components described in connection with FIGS. 1 and 4. Generally, the process provides for the predictive delivering or caching of a first subset of channels from a content server to one or more end users. By predictively pre-delivering or caching the first subset of channels to the end users at a time when transmission rate is not critical, the process can opportunistically take advantage of low-cost delivery options and/or reduce the amount of data that must be delivered or streamed on demand at the time of consumption. The process is described in more detail below.

In Block 310, the process identifies content available to an end user. The content available to the end user will depend on the specific application and service being provided. For example, in the context of a media streaming service, the available content may be determined based on the end user's subscription, purchases, preferences, requests, geography, demographics, etc. Similarly, in the context of a videogame, the available content may be a factor of the end user's, or videogame character controlled by the end user, current progress in the game, level, progress through the videogame, experience, subscription, purchases, preferences, requests, demographics, etc. Once the available content has been identified, the process proceeds to 320.

In Block 320, the process determines the probability that the end user device, for example as operated by or in conjunction with operations by the end user, will request a particular content file out of the content available to the end user. There are various ways of determining this probability. In some embodiments, the process analyzes one or more of the end user's content consumption history and patterns, request history and patterns, demographic data, preferences, geography, language, subscriptions, user-provided interests and data, and any other information useful in determining the probability that the end user will request a particular content file in the future. Additionally or alternatively, the process may analyze data collected from or based on activities of other end users, including those other users sharing characteristics or usage patterns of the end user, and those who are within the end user's social networks.

In some embodiments, such as a media streaming application, the process may analyze the programming that is expected to be delivered in the near future (e.g., the next song or video in the playlist or radio stream) and assign a high probability to those content files. In some embodiments, for example, in a videogame application, the process may analyze the assets that are needed for an upcoming stage, area, or level that the end user (or character controlled by the end user) will encounter and assign a high probability to those content files.

In some embodiments, the process may analyze the end user's requests in assigning probabilities. For example, in a media streaming application, if the end user has requested or otherwise indicated that he will be viewing a video at a future time (e.g., viewing an episode of a show set to broadcast next week at a certain time), the process can assign a high probability to that future episode.

In some embodiments, the process may employ data mining or crowdsourcing behavior and requests of end users to determine the probabilities of requesting certain content files.

In Block 330, the process determines the amount of storage available to the process for storing channels and related data. In some embodiments, the amount of storage available to the process may be limited only by the size of the end user device's cache or memory. In some embodiments, the process or end user may allocate the amount of storage available to the process. For example, the process or end user may allocate to the process a fixed amount of storage (N gigabytes) or a percentage of the total storage, or percentage of total available storage, either of which may be with respect to a particular type of end user device storage, of the end user's device. In some embodiments the end user device transmits, for example to a server, indications of total storage and/or total available storage, with respect to particular types of storage in some such embodiments.

In some embodiments, the process may further allocate storage depending on factors such as the format of the original content file and the source of the content. For example, the process may allocate different storage limits for video content, audio content, or binary executables. Additionally or alternatively, the process may allocate different content providers different amounts of storage. As discussed below, the amount of storage available to the process may determine what content channels are transmitted to the end user's device.

In Block 340, the process transmits the first subset of channels for one or more content files based on the determined factors, such as the determined probabilities that the end user will consume the content file and/or the amount of storage determined to be available to the process. The first subset of content channels may be encoded in accordance with the examples and descriptions provided herein, for example, in connection with FIG. 2.

In some embodiments, the process may transmit the first subset of channels for the content file with the highest probability or the content files that exceed a certain threshold probability. For example, the process may transmit the first channels for any original content file that has at least a 75% chance of being requested according to the determined probabilities, which may be considered as being determined by a probability model.

In some embodiments, the process may deliver the first channels for the original content files with the highest probability up to a certain storage limit associated with the end user device's cache or memory. For example, the process may cache no more than N gigabytes or M percent of the total storage space of data on a particular end user's device. Further, as discussed above, in some embodiments, the amount of storage available to the process may depend on factors such as the format of the original content file and the source of the content.

In some embodiments, the process may deliver the first channels for the content files based on the network connection quality between the content server and the end user's device. For example, where the network connection quality is determined to be poor (or good), the process may pre-deliver more (or less) data to the end user's device. It may be advantageous, in some embodiments for example, to pre-deliver more content when the connection is poor, for example, to reduce the amount of data that must be streamed during content consumption.

Figure 4:
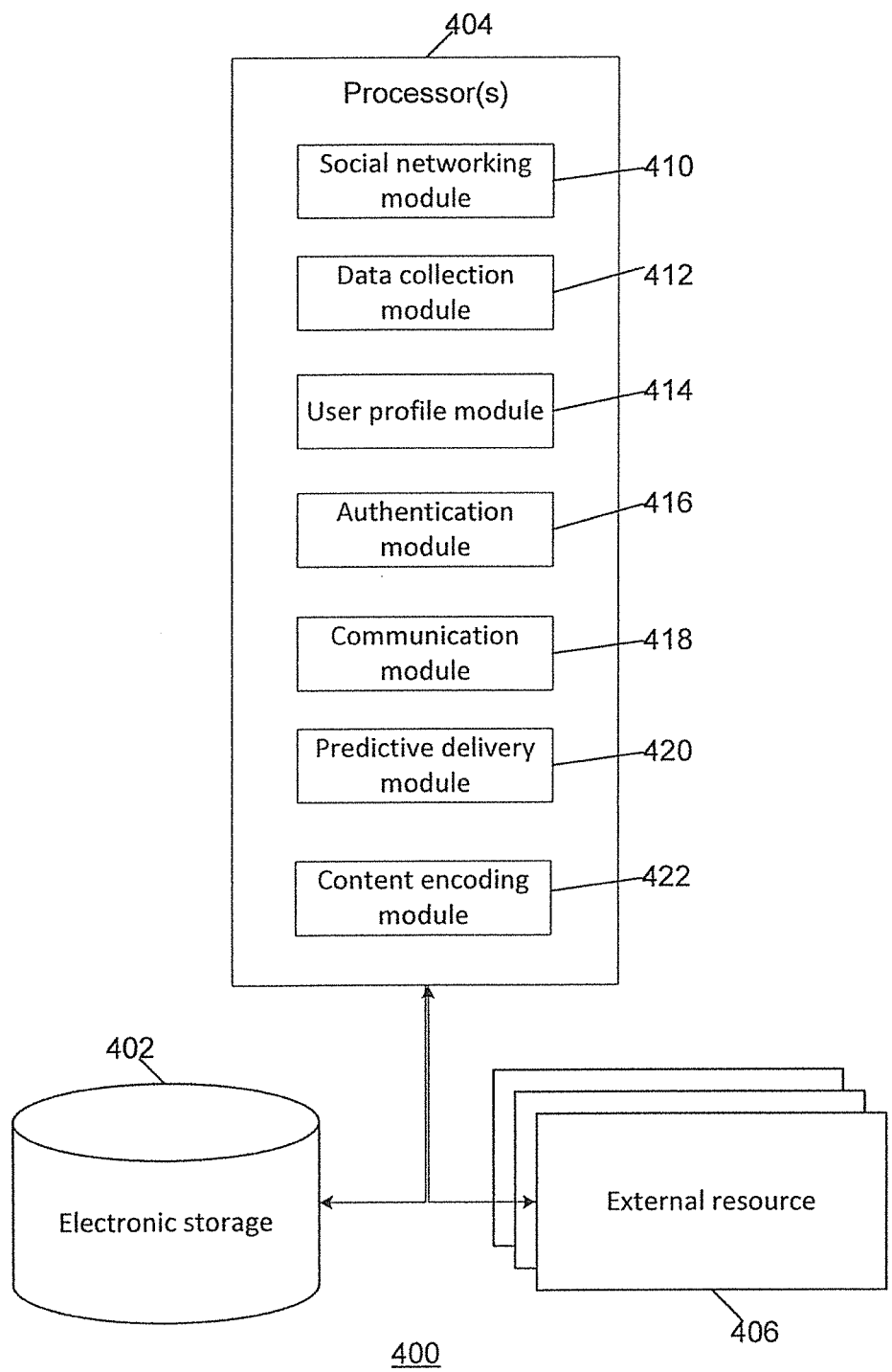
FIG. 4 illustrates an example block diagram of content server in accordance with aspects of the invention.
Figure 5:
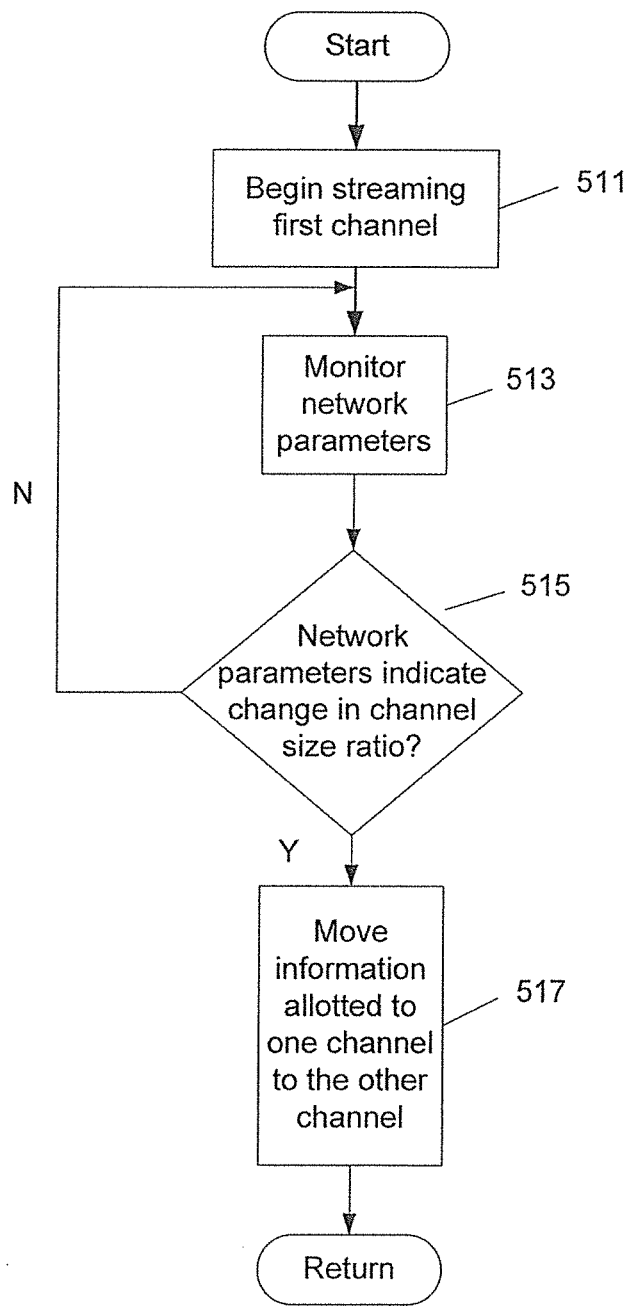
FIG. 5 is a flow chart of a process for varying relative size of a first subset of channels and a second subset of channels to an end user device in accordance with aspects of the invention.

FIG. 5 is a flow chart of a process for varying relative size of a first subset of channels and a second subset of channels to an end user device in accordance with aspects of the invention. The process may be used in conjunction with the processes described, for example, in connection with FIGS. 2, 3 and herein. The process may be performed, for example, by the systems and components described in connection with FIGS. 1 and 4. In some embodiments the process is performed by a content server of FIG. 1 or FIG. 4.

In block 511 the process begins streaming a first subset of channels to an end user device. The first subset of channels includes information of a content file. The first subset of channels has insufficient information to recover the content file, with a second (or more) subsets of channels necessary to recover the content file. The first subset of channels may have insufficient information to recover the content file through lack of sufficient information of the content file (with a remainder of the sufficient information provided by the second (or more) subsets of channels, or through transformation of the information in the first subset of channels, for example through encryption, with the second (or more) subsets of channels including information for performing an inverse or other transform to recover the content file for use. In some embodiments the first subset of channels may include only a single channel, and in some embodiments the first subset of channels may include multiple channels. Similarly, the second (or more) subset of channels may include only a single channel or may include multiple channels. For ease of exposition, with respect to FIG. 5, the first subset of channels will be discussed as a first channel and the second (or more) subsets will be discussed as a second channel.

In block 513 the process monitors network parameters. In some embodiments the network parameters include and/or consist of one or more parameters indicative of quality of network connection between a content server streaming the first channel and an end user device. In some embodiments monitoring of network parameters includes monitoring retry requests from the end user device. In some embodiments monitoring of network parameters includes monitoring of quality of service metrics. In some embodiments monitoring of network parameters includes determining elapsed time between sending a packet from the content server to the end user device and receipt of a responsive packet, sent by the end user device, at the content server. In some embodiments monitoring of network parameters may occur prior to streaming the first subset of channels to the end user, in some embodiments monitoring of network parameters may occur during streaming of the first subset of channels to the end user, and in some embodiments monitoring of network parameters may occur prior to and during streaming of the first subset of channels to the end user. In some embodiments the process derives network parameters as part of monitoring network parameters. In some embodiments the network parameters may be derived based on past histories of network behavior over time, which in some embodiments is past histories of streaming channels to the end user device, or other device associated with that user.

In block 515 the process determines whether the network parameters indicate a change in relative size of the first channel with respect to the second channel is warranted. For example, in some embodiments if the network parameters indicate a quality of network connection between the content server and the end user device is below a first threshold, then some information allotted to the second channel instead may be allotted to the first channel, thereby increasing relative size of the first channel with respect to the second channel. Conversely, in some embodiments if the network parameters indicate a quality of network connection between the content server and the end user device is below the first threshold, then some information allotted to the first channel instead may be allotted to the second channel, thereby increasing relative size of the second channel with respect to the first channel. In some embodiments if the network parameters indicate a quality of network connection between the content server and the end user device is above a predetermined threshold, then some information allotted to the first channel instead may be allotted to the second channel, and conversely, in some embodiments the re-allotment may be from the second channel to the first channel. In some embodiments a plurality of thresholds may be used, with different thresholds indicating different desired ratios of size of the first channel relative to size of the second channel. If the process determines a change in relative size of the first channel with respect to the second channel is warranted, the process continues to block 517. Otherwise the process returns to block 513.

In block 517 the process changes allotment of information between the first channel and second channel. In some embodiments the process changes allotment of information in accordance predetermined ratios associated with different thresholds.

The process thereafter returns. In some embodiments the process returns to block 511, allowing for dynamic readjustment of relative sizes of the first channel and the second channel during streaming of the first channel.

In some embodiments, pre-delivering a first subset of content channels may include removing data from the end user device's memory or cache according to some predefined algorithm, such as removing the least-recently used data.

In some embodiments, pre-delivering a first subset of channels may include beginning delivery of the second subset of channels to the end user before the first subset of channels is completely delivered. In certain embodiments where both subsets of channels are being at least in part transmitted to the end user concurrently, the network bandwidth devoted to either the first subset of channels or the second subset of channels or both may be constrained to certain minimums, maximums or pre-determined ratios.

Although the process is described in terms of assigning probabilities to various pieces of content, other methods may be used to determine what content to pre-deliver. For example, in some embodiments, the process only pre-delivers content specifically requested by the end user. In other embodiments, the process pre-delivers content according to schedules determined by the application and/or content provider.

Figure 6:
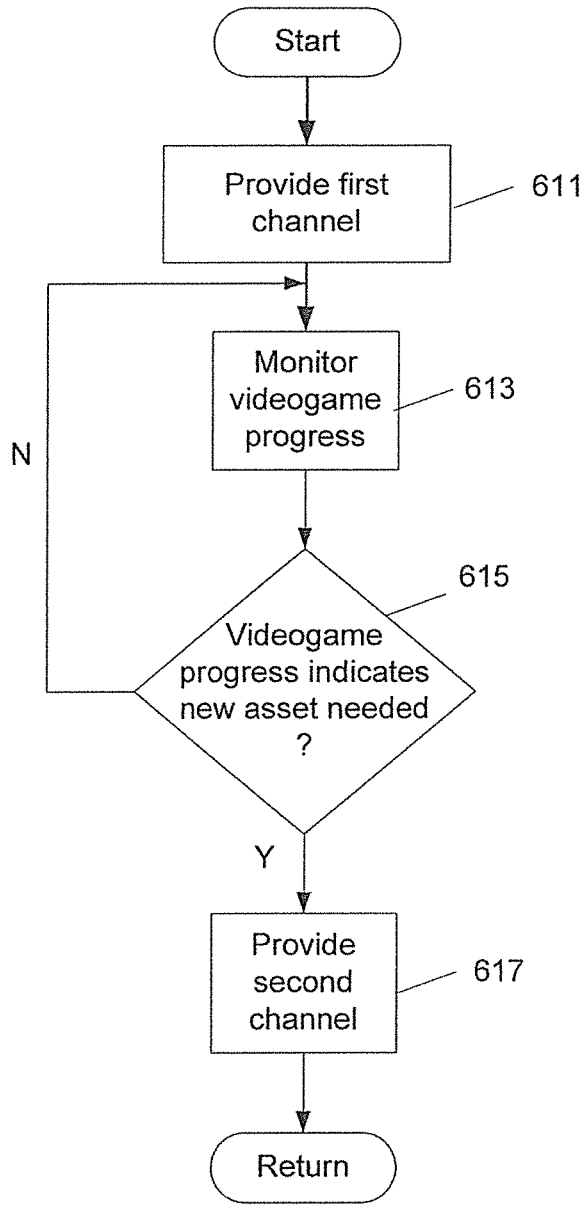
FIG. 6 is a flow chart of a process useful in providing content for use in a videogame in accordance with aspects of the invention.

FIG. 6 is a flow chart of a process useful in providing content for use in a videogame in accordance with aspects of the invention. The process may be used in conjunction with the processes described, for example, in connection with FIGS. 2, 3 and herein. The process may be performed, for example, by the systems and components described in connection with FIGS. 1 and 4. In some embodiments the process is performed, in whole or in part, by a content server of FIG. 1 or FIG. 4.

In block 611 the process provides a first subset of channels to an end user device. For convenience of exposition as previously discussed, the first subset of channels will be termed a first channel. The first channel is encoded with content of a videogame, with the content, and encoding of content, otherwise as elsewhere discussed herein. The content may be, in various embodiments, some or all of audio content, video content, audiovisual content, information associated with graphics rendering for the video game. The content may be considered a videogame asset. In some embodiments the first channel is transmitted from a content server to the end user device. In some embodiments the first channel is streamed from the content server to the end user device. In some embodiments the first channel may be provided by way of non-transient physical media in which the first channel is written.

In block 613 the process monitors one or more aspects of progress of execution of the videogame to which the content relates. In some embodiments the aspect is a level of a character in the videogame. In some embodiments the aspect is a number of points associated with the character. In some embodiments the aspect is a location of the character in a virtual world of the videogame.

In block 615 the process determines if the aspect of progress of execution of the videogame indicates a new videogame asset will be needed or useful in further execution of the videogame. In some embodiments the new videogame asset will be considered as needed if the aspect of progress of execution of the video game approaches a point in videogame play at which availability of the asset would be expected to or could occur within a predetermined time of further videogame play. In some embodiments the new videogame asset will be considered as needed if the aspect of progress of execution of the video game indicates that the level of the character, or some other aspect of play, reaches a predetermined threshold. If the process determines that the aspect of progress of execution of the videogame indicates a new videogame asset will be needed or useful in further execution of the videogame, then the process continues to block 617. Otherwise the process returns to block 613.

In block 617 the process streams a second subset of channels to the end user device. For convenience of exposition as previously discussed, the second subset of channels will be termed a second channel. Content and encoding of the second channel is as elsewhere discussed herein.

The process thereafter returns.

Figure 7:
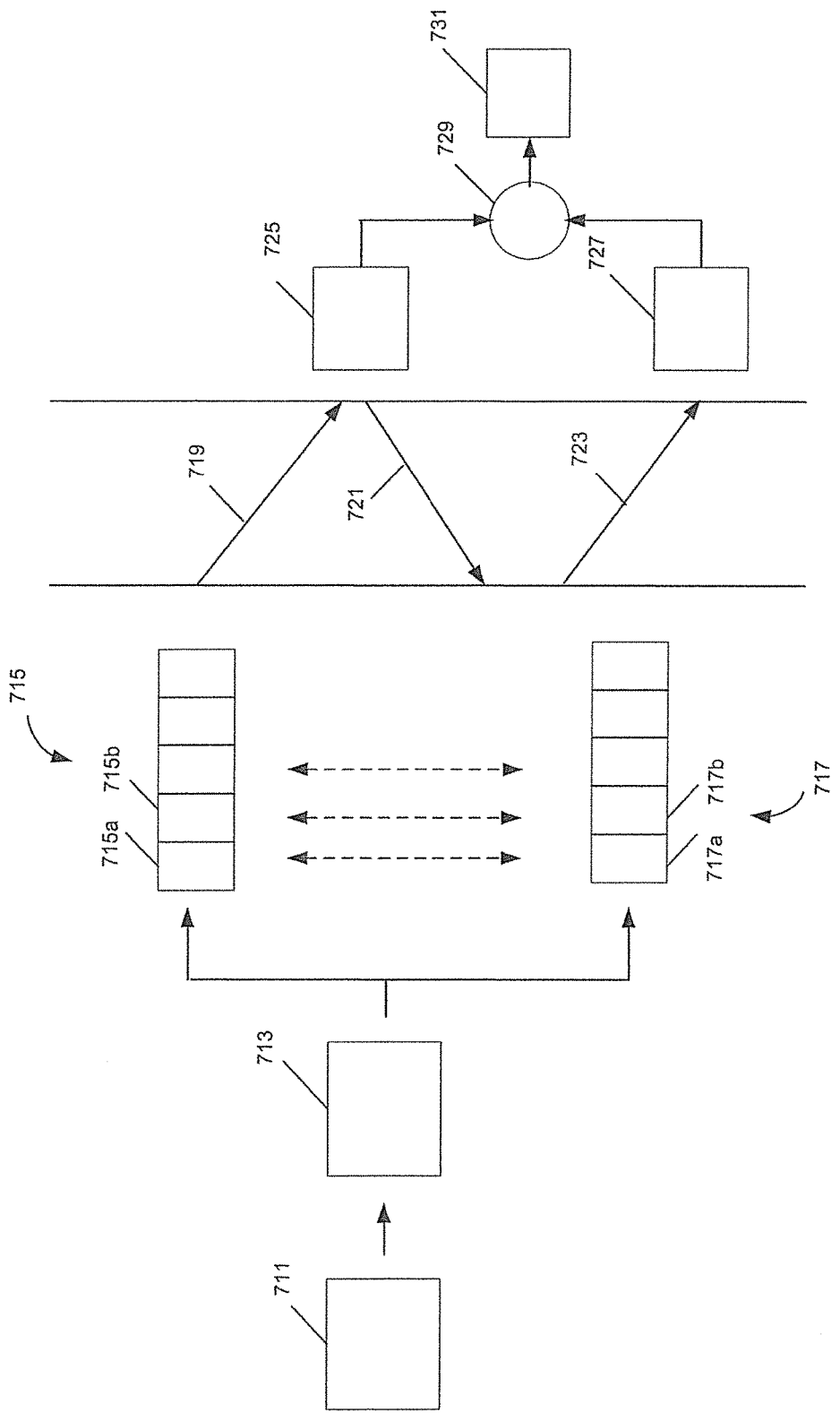
FIG. 7 illustrates example data flow of information from a server to an end user device in accordance with aspects of the invention.

FIG. 7 illustrates example data flow of information from a server to an end user device in accordance with aspects of the invention. Block 711 represents a content file. The content file, in various embodiments, is a file containing media information. In some embodiments the media information is in a format suitable for use and presentation by a media player or other proprietary software programs, executing on a device including one or more processors, having capability for providing for display of media information. In some embodiments the other proprietary software programs may be videogame software programs, which provide for videogame play. In some embodiments the videogame software program may provide a virtual world populated by virtual characters, with at least one of the characters controllable by a user providing user inputs to the device. In some embodiments the media information is audio, video, or audiovisual information. In some embodiments the media information is information for use in rendering visual scenes of a virtual world, or a portion of a virtual world of a videogame, or for providing audio associated with the virtual world.

Block 713 also represents the content file, in some embodiments. In other embodiments, however, block 713 represents a transformed content file. In such embodiments the content file of block 711 may be considered an original content file, and the content file of block 713 may be considered a transformed content file. The transformed content file may be the original content file, after being subjected to a transform. The transform may be, for example, a cryptographic transform, a compression transform, some other transform, or a combination or combinations of such transforms.

Blocks 715 and 717 each represent a subset of channels, which may be a file, to which information of, or associated with the content file represented by block 713 is encoded. For purposes of exposition, the block 715 will be considered a first channel, which in some embodiments it is, and block 717 will be considered a second channel, also which in some embodiments it is.

In some embodiments information of the content file is allotted to either the first channel or the second channel based on a fixed ratio. For example, in some embodiments a fixed percentage of data of the content file is allotted to the first channel, with the remainder allotted to the second channel. In some such embodiments, the fixed percentage may be applied on a data block by data block basis, with for example a data block being a defined by a set number of bytes, a defined construct within the content file, or some other basis. In some embodiments in which the content file is encrypted, encrypted information of the content file is allotted to the first channel and information to allow decryption is allotted to the second channel. Similarly, in embodiments in which the content file is a transformed content file, transformed information of the content file is allotted to the first channel and information to allow an inverse transformation, or other transformation allowing for sufficient recovery of content of the content file, is allotted to the second channel. In some embodiments allotment of information to the first channel and the second channel varies during process of allotment. For example, in some embodiments transfer of the first channel to an end user device may begin during the allotment process, with allotment of information to the channels varying based on progress of or parameters associated with the transfer.

As illustrated in FIG. 7, each of the first channel and the second channel include a plurality of blocks of data, for example blocks 715a,b in the first channel and blocks 717a,b in the second channel. In some embodiments each block of the first channel is associated with a corresponding block in the second channel. For example, in some embodiments block 715*a* of the first channel may be associated with block 717*a* of the second channel, in that combined processing of block 715*a* and 717*a* may be used to derive a block of information of the original content file. Similarly, blocks 715*b* and 717*b* may also be so associated. In some embodiments the blocks of the first channel may be considered arranged in a sequence, and blocks of the second channel may also be considered as arranged in a corresponding sequence, with each block in one channel associated with a block of the other channel by position in the sequence.

Although the blocks of the first channel and the second channel are visually shown in FIG. 7 as of similar size, in many embodiments blocks of the second channel are of smaller size, for example in terms of bytes, than blocks of the first channel. Moreover, in various embodiments, size of blocks within a channel may also vary, for example based on position of the blocks in a sequence of blocks.

In addition, in some embodiments the first channel and the second channel are transforms, and/or results of or information associated with transforms, of information of the content file. For example, in some embodiments information of the content file may be transformed, for example by way of a cryptographic and/or compression process, as part of the process of placing, or encoding, information of the content file into the channels.

Arrow 719 of FIG. 7 represents transfer of the first channel to an end user device. The transfer may be made by way of a transmission over the network by a server, which for example may perform the processes described above with respect to operation on the content file and/or channels. The transfer may occur at a first time t1, for example. Subsequently, for example at a second time t2, the end user device may indicate, for example by way of a transmission to the server as represented by arrow 721, a possible use of the content file associated with the transferred first channel. The time t2 may be a varying time after t1, in many embodiments. In some embodiments the end user device may indicate the possible use by transmitting a request for the content file to the server. In some embodiments the end user device may transmit other information, from which the server may deduce that the end user device may possibly request use, or use, the content file in the future.

Responsive to receipt of the indication, the server transmits the second channel to the end user device, with the transmission represented by arrow 723.

Block 725 represents the first channel, received by the end user device. Similarly block 727 represents the second channel, as received by the end user device. In various embodiments the first channel and the second channel, or portions thereof, may only be retained by the end user device for limited periods. For example, in some embodiments, portions of the second channel may only be retained until utilized by the end user device, or for only limited predefined time periods after such use.

Block 729 represents processing, in combination, of information of the first channel and the second channel by the end user device. The processing, in combination, of information of the first channel and the second channel produces information 731, useable by the end user device, to allow for use, for example audio, video, or audiovisual presentation, of information of the original content file.

FIG. 4 is an example of a block diagram of a content server 400 useful in accordance with aspects of the invention. Content server 400 is coupled to a network (not explicitly shown), for example the Internet. In some implementations, content server 400 may comprise one or more of electronic storage 402, processor(s) 404, external resources 406, and/or other components. The various components of content server 400 may be configured for electronic communication among one another. Such communication may be accomplished via one or more networks, one or more direct connections, one or more wireless connections, one or more wired connections, and/or other electronic communication media. Content server 400 may be in communication with end user devices and other client computing platforms using a client/server architecture. End users, using end user devices, access content server 400 directly or indirectly through an interface internal to an application such as a videogame or media streaming application or client application and/or through a web browser. In some embodiments, content server 400 may be part of an application-related server, such as a videogame server or media streaming server. Additionally or alternatively, content server 400 may be separate from an application-related server, such as a videogame server or media streaming server.

Processor(s) 404 may be configured to provide information processing capabilities within content server 400. For example, processor(s) 404 may configured to execute computer program modules that may include one or more of a social networking module 410, a data collection module 412, a user profile module 414, an authentication module 416, a communication module 418, a predictive delivery module 420, a content encoding module 422, and/or other modules. In various embodiments, these modules may perform various operations as further discussed herein.

In some embodiments, content encoding module 422 performs operations relating to encoding a content file into a plurality of channels, as described in detail herein. In some embodiments, content encoding module 422 encodes content files based in part on information stored in other modules, such as social networking module 410, data collection module 412, and user profile module 414.

In some embodiments, predictive delivery module 420 performs operations relating to predictively pre-delivering content to end users, as described in detail herein. In some embodiments, predictive delivery module 420 mines data collected by other modules such as social networking module 410, data collection module 412, and user profile module 414.

In some embodiments, social networking module 410 provides the framework for user-to-user interactions. Social networking module 410 may include a database that stores user relationships, user profiles, user messages, and user social data. Social networking module 410 may provide for social networking features in accordance with the present invention. For example, social networking module 410 may provide the framework to allow predictive pre-delivery of content based on the behavior and consumption patterns of an end user's social connections. Examples of social networks include websites such as Facebook and Twitter, and also include social networks within other frameworks such as those found in Xbox Live and the PlayStation Network.

In some embodiments, data collection module 412 performs operations relating to the collection of information regarding end users, social networks, application data, and network connection quality indicators. In some embodiments, the data collected is used by other modules such as social networking module 410, predictive delivery module 420, and content encoding module 422.

In some embodiments, user profile module 414 receives and/or determines end user information, for example end user login names and passwords, email addresses, user skill levels, device capabilities, subscriptions, demographics, application preferences, and/or financial information (e.g., credit card information, billing addresses, and any other information required to complete potential e-commerce transaction).

In some embodiments, authentication module 416 performs operations relating to authentication of end users. In some embodiments, communications module 418 performs operations relating to communication with storage and/or external resources, as well as communicating data to end users and other content servers over a network, for example the Internet.

In some implementations, electronic storage 402 may include content and information relating to content and end users. In some implementations, electronic storage 402 may comprise non-transitory electronic storage media that electronically stores information. Electronic storage 402 may include one or both of system storage that is provided integrally (e.g., substantially non-removable) with content server 400 and/or removable storage that is removably connectable to content server 400 via, for example, a port (e.g., a USB port, a firewire port, etc.) or a drive (e.g., a disk drive, etc.). Electronic storage 402 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 402 may include virtual storage resources, such as storage resources provided via a cloud and/or a virtual private network. Electronic storage 402 may store software algorithms, information determined by processor 404, and/or other information that enables content server 400 to function properly. Electronic storage 402 may be a separate component within content server 400, or electronic storage 402 may be provided integrally with one or more other components of content server 400. For example, in certain implementations, the non-transitory electronic storage media of electronic storage 402 may include a cache (e.g., L1 cache, L2 cache, etc.) of processor 404.

In some implementations, electronic storage 402, processor(s) 404, external resources 406, and/or other components (e.g., additional instances of content servers) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which electronic storage 402, processor(s) 404, external resources 406, and/or other components may be operatively linked via some other communication media.

In some implementations, the external resources 406 may include services and information sources external to content server 400, for example, third-party social networking services external to content server 400, third-party content databases and catalogs, web hosting services, game server services, media streaming services, etc. In some implementations, some or all of the functionality attributed herein to external resources 406 may be provided by resources included in content server 400.

In some implementations, processor(s) 404 may include one or more of a digital processor, an analog processor, a digital circuit designed to process information, an analog circuit designed to process information, a state machine, and/or other mechanisms for electronically processing information. Although processor(s) 404 is shown in FIG. 4 as a single entity, this is for illustrative purposes only. In some implementations, processor(s) 404 may include a plurality of processing units. These processing units may be physically located within the same device, or processor(s) 404 may represent processing functionality of a plurality of distributed devices operating in coordination.

Processor(s) 404 may be configured to execute social networking module 410, data collection module 412, user profile module 414, authentication module 416, communication module 418, predictive delivery module 420, content encoding module 422, and/or other modules. Processor(s) 404 may be configured to execute modules 410, 412, 414, 416, 418, 420, 422, and/or other modules by software; hardware; firmware; some combination of software, hardware, and/or firmware; and/or other mechanisms for configuring processing capabilities on processor(s) 404.

It should be appreciated that although modules 410, 412, 414, 416, 418, 420, and 422 are illustrated in FIG. 4 as being co-located within a single processing unit, in implementations in which processor(s) 404 includes multiple processing units, one or more of modules 410, 412, 414, 416, 418, 420, and 422 may be located remotely from the other modules. The description of the functionality provided by the different modules 410, 412, 414, 416, 418, 420, and 422 provided below is for illustrative purposes, and is not intended to be limiting, as any of modules 410, 412, 414, 416, 418, 420, and 422 may provide more or less functionality than is described. For example, one or more of modules 410, 412, 414, 416, 418, 420, and 422 may be eliminated, and some or all of its functionality may be provided by other ones of modules 410, 412, 414, 416, 418, 420, and 422. As another example, processor 404 may be configured to execute one or more additional modules that may perform some or all of the functionality attributed below to one of modules 410, 412, 414, 416, 418, 420, and 422.

Although the invention has been described with respect to certain embodiments and examples, it should be recognized that the invention comprises the novel and non-obvious claims and their insubstantial variations supported by this disclosure. Aspects of the invention may be applied to any application requiring the secure delivery of content from content providers to end users. For example, in the context of streaming audio/visual media, content providers may securely pre-deliver substantial portions of the audio/visual media to end users using a first set of content channels taking advantage of low-cost delivery options and reducing the amount of data that must be delivered at the time of consumption. Similarly, videogame developers and service providers may opportunistically and securely pre-deliver videogame media and assets to end users using the teachings of the present invention.

What is claimed is:

1. A method performed by a first computer for delivering content to a second computer, comprising:
   encoding information of an original content file into a first channel and second channel;
   transmitting to the second computer the first channel for storage in memory associated with said second computer;
   subsequent to transmitting to the second computer the first channel for storage in memory associated with the second computer, receiving a request from the second computer to present the original content file on said second computer;
   streaming to the second computer the second channel, responsive to the receipt of the request from the second computer to present the original content file on said second computer;

wherein the first channel and second channel must be collectively processed to present the original content file.

2. The method of claim 1, further comprising applying one or more transforms to the first channel, the second channel or both.

3. The method of claim 2, further comprising encoding additional information associated with the one or more transforms to the first channel or the second channel.

4. The method of claim 1, wherein the size of the second channel is based, in part, on a network connection quality between the first computer and the second computer.

5. The method of claim 4, wherein the network connection quality between the first computer and the second computer is based, in part, on at least one of the following network characteristics: the round trip time of sending and receiving packets between the first computer and second computer and one-way measurements of latency between the first computer and the second computer.

6. The method of claim 1, further comprising determining an amount of available storage space available on the second computer, and wherein size of the first channel is based, in part, on the amount of available storage space on the second computer.

7. The method of claim 1, further comprising determining a probability that a first end user will request the original content file, and wherein determining the probability that the first end user will request the original content file is based on the content consumption history of the first end user.

8. The method of claim 1, further comprising determining a probability that a first end user will request the original content file, and wherein determining the probability that the first end user will request the original content file is based on content consumption history of other end users within a social network of the first end user.

9. The method claim 1, further comprising identifying a set of original content files available for delivery from the first computer to the second computer, and wherein the identification of the set of original content files available for delivery is based on at least one of the following attributes of a first end user: the end user's subscription, the first end user's purchase history, the first end user's preferences, the first end user's geographic location, the first end user's demographic information.

10. The method of claim 1, wherein transmitting to the second computer the first channel comprises delivering at least some portion of the first channel through an offline medium, and wherein the offline medium is one of: an optical disc, a hard drive device, or a solid-state device.

11. The method of claim 1, wherein encoding information of the original content file to either the first channel or the second channel is based on a format of the original content file.

12. The method of claim 1, wherein the original content file is an audiovisual media file, and information of the original content file is encoded into either the first channel or the second channel based on whether the information comprises key frames.

13. The method of claim 11, wherein the original content file is a binary executable program, and information of the original content file are encoded into either the first channel or the second channel based on whether the information comprises instruction opcodes.

14. A system useful in provision of digital content, comprising:
  a server coupled to a network, the server configured by program instructions executing on at least one processor to:
    encode information of a content file to a first subset of channels and a second subset of channels, with use of information of the content file being dependent upon the information encoded to both the first subset of channels and the second subset of channels;
    transmit the first subset of channels over the network; and
    after transmitting the first subset of channels over the network, responsive to a request received over the network relating to the second subset of channels, received after transmitting the first subset of channels, transmit the second subset of channels over the network.

15. The system of claim 14, wherein the first subset of channels consists of a first channel.

16. The system of claim 14, wherein the second subset of channels consists of a second channel.

17. The system of claim 14, wherein the information encoded to the first subset of channels is significantly greater than the information encoded to the second subset of channels.

18. The system of claim 14, wherein the server is configured to perform modification of allotment of information to be encoded to the first subset of channels and the second subset of channels during transmission of the first subset of channels over the network.

19. The system of claim 14, wherein the request received over the network comprises a request for the content file.

20. The system of claim 14, wherein the request received over the network comprises an indication that a use of the content file is expected.

21. The system of claim 14, wherein the request received over the network comprises an indication of a state of progress of video game play.

22. The system of claim 14, further comprising an end user device, wherein the transmissions over the network are to the end user device, and wherein the end user device is configured to provide for videogame play and to transmit to the server indications of progress of play of a videogame.

23. The system of claim 14, wherein the processor is configured to transmit the second subset of channels over the network prior to completion of transmission of the first subset of channels.

* * * * *

UNITED STATES PATENT AND TRADEMARK OFFICE
CERTIFICATE OF CORRECTION

PATENT NO. : 10,237,331 B2
APPLICATION NO. : 14/996700
DATED : March 19, 2019
INVENTOR(S) : Michael Marr and Keith Kaplan Page 1 of 1

It is certified that error appears in the above-identified patent and that said Letters Patent is hereby corrected as shown below:

In the Claims

Column 21, Line 37, Claim 9, after "method" insert --of--, therefor.

Signed and Sealed this
Twenty-eighth Day of April, 2020

Andrei Iancu
*Director of the United States Patent and Trademark Office*